Patented May 24, 1932

1,859,683

UNITED STATES PATENT OFFICE

KARL STREITWOLF, OF FRANKFORT-ON-THE-MAIN, ALFRED FEHRLE, OF BAD SODEN-ON-THE-TAUNUS, AND WALTER HERRMANN AND PAUL FRITZSCHE, OF FRANK-FORT-ON-THE-MAIN, GERMANY, ASSIGNORS TO WINTHROP CHEMICAL COMPANY, INC., OF NEW YORK, N. Y., A CORPORATION OF NEW YORK

STABLE AQUEOUS SOLUTIONS OF HYDROXY-ETHYLAMINO SALTS OF 3-ACETYLAMINO-4-HYDROXYBENZENEARSONIC ACID

No Drawing. Original application filed January 4, 1930, Serial No. 418,648, and in Germany June 14, 1929. Divided and this application filed February 6, 1931. Serial No. 514,064.

This application is a divisional application of our application for United States Letters Patent, Serial No. 418,648, filed January 4, 1930.

The parent application relates to new hydroxy-ethylamino salts of 3-acetylamino-4-hydroxybenzenearsonic acid.

The present application relates to a method of preparing stable aqueous solutions of the said hydroxy-ethylamino salts of 3-acetylamino-4-hydroxybenzenearsonic acid.

The stable solutions are preferably prepared in the following manner: To an aqueous solution of the said salts which dissolve already in 1.5–2 parts of their weight of water is furthermore added a small quantity of a stabilizing agent, as, for instance, sodium sulfite.

In a similar manner there may be used the solutions obtainable by combining hydroxyethylamine with 3-acetylamino-4-hydroxybenzenearsonic acid prepared according to the example of the parent application, to which solution is added a small quantity of a stabilizing agent, as, for instance, sodium sulfite.

We claim:

1. An aqueous solution of a hydroxyethylamino salt of 3-acetylamino-4-hydroxybenzene arsonic acid of the following probable formula

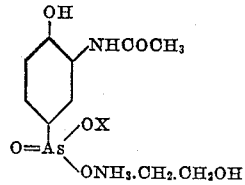

wherein X stands for hydrogen or —NH$_3$.CH$_2$.CH$_2$OH with the addition of a stabilizing agent.

2. An aqueous solution of a hydroxyethylamino salt of 3-acetylamino-4-hydroxybenzene arsonic acid of the following probable formula

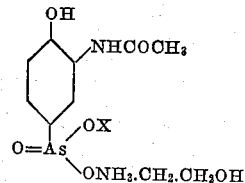

wherein X stands for hydrogen or —NH$_3$.CH$_2$.CH$_2$OH with the addition of a small quantity of sodium sulfite.

3. An aqueous solution of a hydroxyethylamino salt of 3-acetylamino-4-hydroxybenzene arsonic acid of the following probable formula

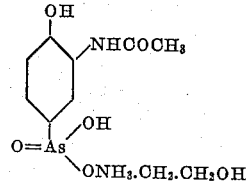

with the addition of a small amount of sodium sulfite.

4. An aqueous solution of a hydroxyethylamino salt of 3-acetylamino-4-hydroxybenzene arsonic acid of the following probable formula

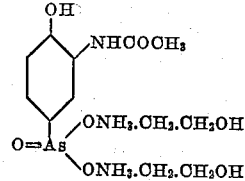

with the addition of a small amount of sodium sulfite.

In testimony whereof, we affix our signatures.

KARL STREITWOLF.
ALFRED FEHRLE.
WALTER HERRMANN.
PAUL FRITZSCHE.